United States Patent [19]

Penner

[11] 4,124,247
[45] Nov. 7, 1978

[54] QUICK DETACHABLE HINGING STRUCTURE

[76] Inventor: Benjamin L. Penner, 1760 Whitwood La. #1, Campbell, Calif. 95008

[21] Appl. No.: 743,134

[22] Filed: Nov. 19, 1976

[51] Int. Cl.² .............................................. B60P 7/02
[52] U.S. Cl. ................................. 296/100; 296/137 B
[58] Field of Search ........................... 296/100, 137 B; 248/214, 222.2; 49/397

[56] References Cited

U.S. PATENT DOCUMENTS

| 2,659,491 | 11/1953 | Williams | 248/214 |
| 2,877,840 | 3/1959 | Hurowitz et al. | 49/397 X |
| 2,989,340 | 6/1961 | Penner | 296/100 |
| 3,489,456 | 1/1970 | Klanke | 296/100 |
| 3,536,352 | 10/1970 | Beckley | 296/100 X |
| 3,596,859 | 8/1971 | MacDonald | 248/214 |
| 3,923,334 | 12/1975 | Key | 296/100 X |

Primary Examiner—Evon C. Blunk
Assistant Examiner—Michael J. Forman
Attorney, Agent, or Firm—Gerald L. Moore

[57] ABSTRACT

A detachable structure for mounting a cover over the bed of a pickup truck, for quick attachment without bolting. A pair of mounting brackets are provided, each including surfaces which interlock with the pickup bed side walls when placed thereon. These mounting brackets releasably engage the cover in a manner to allow pivotal movement thereof. Coil springs extend between the cover and the mounting brackets to retain the brackets on the bed side walls and hold the cover in the open or closed position.

3 Claims, 6 Drawing Figures

QUICK DETACHABLE HINGING STRUCTURE

BACKGROUND OF THE INVENTION

In my U.S. Pat. No. 2,989,340 I have disclosed a detachable hinging structure primarily for use with a cover for a pickup truck. In that structure the parts which attach to the pickup truck body are mounted by the use of screws. Thus attachment and removal of the cover requires the drilling of holes into the pickup body, namely the walls of the bed. Such covers are effective only if they can be removed when desired to allow the hauling of articles which stick above the bed side walls. Naturally the easier it is to remove the cover the better. However frequently the need to remove the cover may occur when tools are not available as are necessary for the removal of prior covers. In addition it is desirable that few holes or openings be made in the bed for attachment of the cover, since these are unsightly when the cover is removed.

It is the purpose of this invention to provide an improved means for quickly and securely attaching a cover to a pickup bed.

SUMMARY OF THE INVENTION

For attaching a cover to the side walls of the bed of a pickup truck there is provided a hinge structure comprising a pair of mounting brackets; one for attachment to each of the side walls and including flanges for abutting the top of the cooperating side wall, the inside surface of the side wall and an underside surface of the side wall. Hinge means are provided for pivotally attaching the cover to each bracket and a coil spring can be affixed between each bracket and the top. Thus the brackets may be mounted onto the side walls of the pickup truck bed, the cover pivotally attached to the brackets and a coil spring connected between the cover and each bracket such that the parts interlock to prevent accidental separation of the cover from the bed while permitting pivoting of the cover upward from the bed side walls to allow loading and unloading of the truck.

DESCRIPTION OF THE INVENTION

Figure 1:
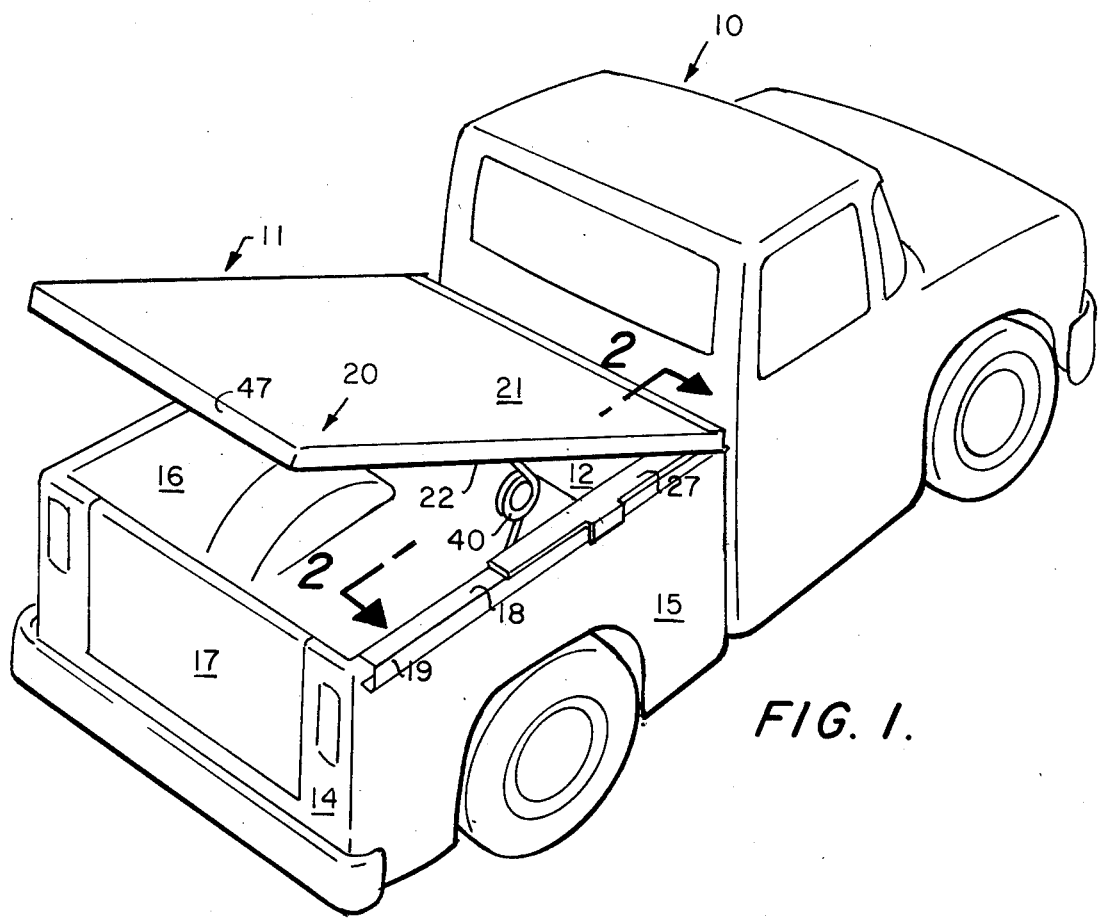
FIG. 1 is a perspective view of a pickup truck having a cover fixed thereto by the present invention.

Referring to FIG. 1 the invention is illustrated in connection with a conventional pickup truck 10 having a bed 11. The bed comprises a front wall 12, a rear wall 14 and a pair of side walls 15 and 16. The rear wall includes a hinged door 17. In addition, the side walls each have a top facing surface 18 and a vertically extending side flange member 19 (see FIG. 5) presenting a downward facing undersurface 20.

Provided for covering the bed 11 is a cover 20 comprising a top surface 21 and a bottom surface 22. This cover preferably is made of aluminum or other stiff material so as to be self-supporting in a planer configuration and is dimensioned to extend over the two side walls and the two end walls of the truck bed simultaneously to enclose the bed interior. It is the purpose of the present invention to provide a simple and quickly detachable means for pivotally connecting this cover to the wall members of the truck bed.

In accordance with the present invention there is provided a mounting bracket for attachment to each side wall of the truck bed. Thus a mounting bracket 25 is fixed to the side wall 15 and a mounting bracket 26 is fixed to the side wall 16. These mounting brackets are identical except that one is for the right side and the other is a mirror image of the first for mounting on the left side. Each mounting bracket comprises a top flange 27 and a vertically extending side flange 28 attached at the inside edge to the top flange. In addition as shown in FIG. 5 there is provided an outside vertically extending flange 29 to which is attached at the bottom edge a horizontally extending bottom flange 30 which is positioned to fit against the undersurface 20 the bed side wall.

Figure 5:
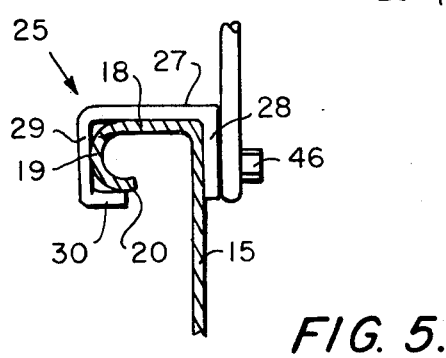
FIG. 5 is a cross-sectional view along the line 5—5 of FIG. 3.

Thus as illustrated primarily in FIG. 5 the bracket is placed on the top edge of the side wall by tilting it about the longitudinal axis with the flange 28 at a higher elevation such that the bottom flange 30 can be slipped beneath the lip of the side wall to abut the undersurface 20. Thereafter the bracket is rotated to bring the top flange 27 down against the top wall 18 of the bed side wall.

Figure 3:
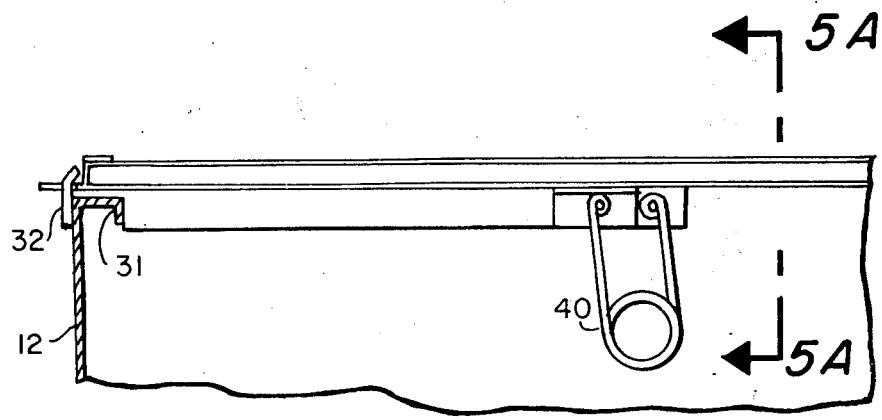
FIG. 3 is the same view as FIG. 2 with the cover in the closed position.
Figure 4:
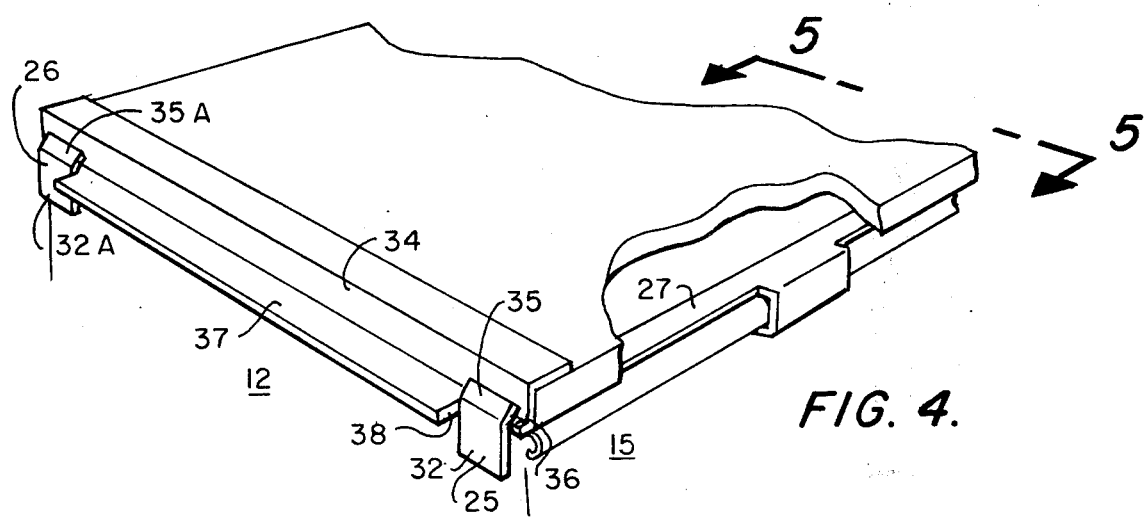
FIG. 4 is a perspective view of the cover fixed to the bed and in the closed position but partly cut away to show the mounting bracket.

To keep the bracket from sliding forward and back, the side flange 28 and bottom flange 30 as shown primarily in FIG. 3 include a cutout portion 31 for accomodation of the front wall 12 of the pickup bed. Thus the top flange 27 extends to a perpendicular extending end flange 32. This bracket is welded to the end of the top flange 27 so as to extend vertically along the outside of the front wall 12 of the bed on the outside thereof. The bracket can be placed in position in the manner described and will not slip along the side wall because of the end flange being locked over the end wall of the bed.

Thus a bracket 25 is fitted over the side wall 15 and a bracket 26 is fitted over the side wall 16 with the end flanges 32 and 32A respectively extending forward past the front wall 12 of the bed. After the brackets are placed in this position the cover 20 is laid thereon with the front edge 34 shoved forward against the end flanges 32 and 32A. The top edge 35 of the end flanges receive a front flange 36 fixed to the front edge 34 of the cover. This front flange 36 can include a cutout area for receiving the front flanges with the center portion 37 thereof extending horizontally past the end flanges. Such a position provides a shoulder 38 which abuts the end flanges and prevents side movement of the cover. The upper extending ends 35 and 35A are bent slightly backwards towards the top flange 27 and 27A at an angle to prevent the cover from being lifted vertically upward once in place.

To hold the cover integrally with the brackets and in either the closed or open position there is provided a coil spring 40 (see FIGS. 1 through 3) having the extending ends 41 and 42 for each bracket. The end 41 is fixed by a bolt 45 to a vertically extending cover bracket 44 fixed to a side edge of the cover 20. The bolt extends through the cover bracket flange and through the end 41 of the spring which end is bent back on itself to form an eye.

Figure 2:
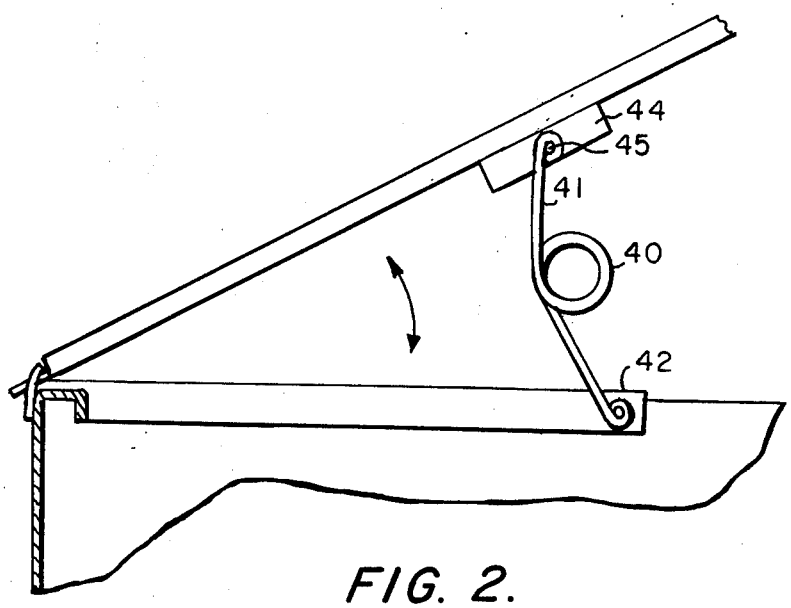
FIG. 2 is a side view of the cover mounting means with the cover open taken along the lines 2—2 of FIG. 1.

The other end 42 of the coil spring is fitted over a stud 46 fixed to the downwardly extending flanges 28 and 28A on the mounting brackets. Thus the spring is held in position and in turn tends to hold the mounting bracket in position on the side wall of the truck bed by preventing pivoting of the bracket such as is necessary for the brackets to be separated from the truck bed side walls. This spring tends to hold the cover in either the open position or the closed position because of its tendency to remain in either of two positions. As shown in FIG. 2 the spring on the cover can be pivoted upward to extend the spring which in turn will hold the cover in that position. On the other hand when the cover is closed the spring is moved to the position shown in FIG. 3 which position tends to hold the lid closed. While not shown a lock can be fixed to the trailing edge 47 of the cover to interlock the cover with the door 17 of the truck bed for preventing access to the interior of the bed.

The particular manner in which the brackets and the cover 20 interlock prevent removal of the cover except in a predetermined sequence. For instance, for removal of the cover from the truck bed, the coil spring 40 must first be removed. Thereafter the cover 20 is shifted rearward to disengage the flange 37 from the front flanges 35 and 35A of the brackets. The cover is then free to be lifted from the truck bed. Thereafter the brackets 25 and 26 can be rotated in a direction away from the bed interior for removal from the truck side wall. Of course replacement of the cover on the bed is done by reversing this sequence.

Figure 6:
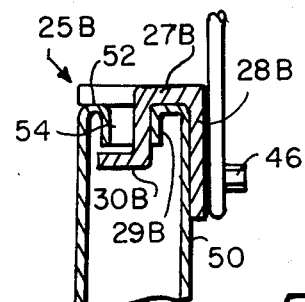
FIG. 6 is a view similar to that of FIG. 5 showing a second embodiment of the invention.

A second embodiment of the invention is shown in FIG. 6 to be used with trucks having a double side wall comprising an interior wall 50 and an exterior wall 51. Such walls generally are joined by a stop wall 52 having openings 54 therein. In this instance the bracket 25B includes at least one side flange 28B fixed to a top flange 27B, which top flange is cut out to only extend halfway across the top wall 52 of the bed side wall at this point. To the top flange is fixed a downwardly extending flange 29B which in turn is welded to a horizontally extending bottom flange 30B.

For placement of this bracket 25B onto the bed side wall, the flanges 29B and 30B are inserted through the opening 54 and thereafter the bracket is rotated in the clockwise direction in FIG. 6 until the flange 28B lies parallel to the inner surface of the side wall 50. The bottom flange 30B locks the bracket to the bed side wall. Thereafter the top is mounted onto this bracket in the same manner as described with respect to the previous embodiment.

The invention claimed:

1. A cover and mounting structure therefor for releasable attachment of the cover to the bed of a pickup truck, said bed having two side walls joined by a front wall with each side wall including a horizontal top, a pair of substantially vertical and opposite facing surfaces, and an inside horizontal underside surface and said front wall having top and forward surfaces, including:

a pair of separate elongated mounting brackets, one for mounting on each side wall of the bed and each including separate surfaces abutting said bed side wall, vertical, horizontal top and horizontal underside surfaces, said horizontal surfaces on each said bracket being separated a fixed distance and separate members extending across the top surface of the front wall and down along the forward surface thereof;

means for releasably interlocking one edge of said cover and corresponding ends of said elongated brackets mounted on the respective side walls and the front wall for allowing pivotal motion therebetween;

a pair of coil springs, each having two ends;

means for releasably attaching one end of each coil spring to said cover and the other coil spring end to a mounting bracket whereby the mounting brackets can be placed on the respective bed side wall and front wall, the cover and brackets joined by the releasable interlocking means and the coil springs connected to the cover and mounting brackets to hold the brackets on the bed side walls thereby fastening the cover on the bed.

2. A cover and mounting structure as defined in claim 1 wherein said means for releasably interlocking the bracket to the cover and the means for attaching the other end of the coil spring to the bracket are spaced apart on the mounting bracket.

3. A cover and mounting structure as defined in claim 2 wherein said means for releasably interlocking the cover and mounting brackets includes a flange fixed to the cover and an end flange on each mounting bracket.

* * * * *